United States Patent
Jain (10) Patent No.: US 10,069,731 B2
(45) Date of Patent: Sep. 4, 2018

(54) FLOW CONTROL ON WIRELINE NETWORK

(71) Applicant: Lantiq Beteiligungs-GmbH & Co. KG, Neubiberg (DE)

(72) Inventor: Raj Kumar Jain, Bangalore (IN)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 0 days.

(21) Appl. No.: 15/122,309

(22) PCT Filed: Mar. 13, 2015

(86) PCT No.: PCT/EP2015/055355
§ 371 (c)(1),
(2) Date: Aug. 30, 2016

(87) PCT Pub. No.: WO2015/136098
PCT Pub. Date: Sep. 17, 2015

(65) Prior Publication Data
US 2016/0373358 A1    Dec. 22, 2016

Related U.S. Application Data

(60) Provisional application No. 61/953,733, filed on Mar. 14, 2014.

(51) Int. Cl.
*H04B 10/27* (2013.01)
*H04L 12/801* (2013.01)
*H04M 11/06* (2006.01)

(52) U.S. Cl.
CPC ............ *H04L 47/10* (2013.01); *H04B 10/27* (2013.01); *H04M 11/062* (2013.01)

(58) Field of Classification Search
CPC ........ H04B 10/27; H04L 47/10; H04L 47/125
See application file for complete search history.

(56) References Cited

U.S. PATENT DOCUMENTS

| 8,532,487 B2 | 9/2013 | Boyd et al. |
| 8,670,667 B1 | 3/2014 | Sandstrom et al. |

(Continued)

FOREIGN PATENT DOCUMENTS

JP    2009536001 A    10/2009

OTHER PUBLICATIONS

International Preliminary Report on Patentability, International Application No. PCT/EP2015/055355, dated Sep. 14, 2016.
PCT Search Report and Written Opinion dated Sep. 10, 2015 in connection with PCT Application No. PCT/EP2015/055355, p. 1-18.
Van der Putten, Frank et al. "G.int, G.fast, Update of G.int for upstream flow control." Alcatel-Lucent, ADTRAN. Barcelona. Sep. 30-Oct. 4, 2013. Question 4/15, 4 pages.

(Continued)

*Primary Examiner* — Dzung Tran
(74) *Attorney, Agent, or Firm* — Eschweiler & Potashnik, LLC (57) ABSTRACT

A Digital Subscriber Line, DSL/G.fast/G.hn, transceiver comprising a plurality of first interfaces configured to transmit data packet streams in a downlink direction to different subscribers and to receive data packet streams from the different subscribers, a second interface configured to transmit data packet streams in an uplink direction to a passive optical network element, and at least one processing unit configured to detect a physical layer indicator of a loss of signal of one of the first interfaces received at a physical layer at said one first interface, wherein when the at least one processing unit detects the physical layer indicator for said one first interface, the second interface transmits the physical layer indicator in the uplink direction to the passive optical network element.

22 Claims, 4 Drawing Sheets

(56) References Cited

U.S. PATENT DOCUMENTS

| | | | |
|---|---|---|---|
| 2007/0109974 A1* | 5/2007 | Cutillo | H04L 12/2856 370/254 |
| 2009/0022404 A1 | 1/2009 | Yang | |
| 2011/0305455 A1* | 12/2011 | Helleberg Andersen | H04J 14/00 398/41 |
| 2012/0020662 A1 | 1/2012 | Ding et al. | |
| 2013/0010585 A1* | 1/2013 | Chu | H04B 3/32 370/201 |
| 2013/0223848 A1 | 8/2013 | Yuda | |
| 2014/0072304 A1 | 3/2014 | Boyd et al. | |
| 2015/0016260 A1* | 1/2015 | Chow | H04L 45/22 370/235 |
| 2015/0138972 A1* | 5/2015 | Peeters | H04M 11/062 370/235 |

OTHER PUBLICATIONS

"G.fast: Proposed working text for flow control from LINK to PHY." Broadcom, Geneva, Switzerland, Dec. 2-6, 2013. Question 4/15. 8 pages.

"Issues and Questions on G.int (G.999.1)," ZTE Corporation. Geneva, May 11-15, 2009. Question 4/15. 8 pages.

Rapporteur, Frank. "Draft new Recommendation ITU-T G.989 (for Consent, Apr. 4, 2014)", International Telecommunication Union. Telecommunication Standardization Sector. Study Period 2013-2016. Mar. 24-Apr. 4, 2014. Question 2/15. 20 pages.

"Series.G: Transmission Systems and Media, Digital Systems and Networks, Digital sections and digital line system—Access networks. Interface between the link layer and the physical layer for digital subscriber line (DSL) transceivers." International Telecommunication Union, G.999.1 (Oct. 2009), 21 pages.

* cited by examiner

FIG 7 ically, the incoming data rate from a central optical
FLOW CONTROL ON WIRELINE NETWORK This application claims the benefit of International Patent Application No. PCT/EP2015/055355 filed on Mar. 13, 2015, which claims priority to U.S. Provisional Application No. 61/953,733 filed Mar. 14, 2014, entitled "FLOW CONTROL ON WIRELINE NETWORK", the contents of which are herein incorporated by reference in their entirety.

FIELD

The present application relates to a digital subscriber line, DSL, transceiver, to a system comprising the DSL transceiver and a passive optical network (PON) element, to a method for operating the DSL or G.fast or G.hn transceiver and the corresponding system. The application furthermore relates to an optical line terminal and a system comprising the optical line terminal and an optical network terminal.

BACKGROUND

Digital subscriber line, DSL, describes a technology for transmitting high bandwidths information to different subscribers with aggregation of data for multiple subscribers over an optical link layer. A flow control per subscriber is needed from a DSL or G.fast or G.hn transceiver or modem to a passive optical network element, also called PON element hereinafter. By way of example, the fiber uplink may have a capacity of 2.5 Gbps or 10 Gbps (gigabit per second) downstream and 1 Gbps or 10 Gbps upstream data rate while the maximum data rates of the DSL transceiver for a subscriber is limited to 400 Mbps in downstream direction or even 1 Gbps for G.fast transceiver and 100 Mbps in the upstream direction or 1 Gbps for G.fast or G.hn transceiver. Furthermore, different subscribers which are connected to the same physical fiber link may have different data rates. By way of example, a first subscriber connected to the DSL or G.fast or G.hn transceiver can have a subscriber line with 50 Mbps, while another subscriber connected to the same DSL or G.fast or G.hn transceiver may have a 1 Gbps connection. Additionally, the incoming data rate from a central optical line terminal (OLT) accessible via the internet and located at a server providing a service to the subscriber and thus from the PON element connected to the OLT could be much higher such as 2.5 Gbps than the total aggregated data rates of the different subscribers which will be much lower and could also vary from 1 Mbps to 1 Gbps. This corresponds to a situation in which a big pipe of data needs to be throttled to a pipe with smaller dimensions. Hence, a network processor with sufficient memories storage is required for the flow control interface between the DSL transceiver and the PON element. Furthermore, it should be guaranteed that no packets are dropped or a minimum quality of service is guaranteed.

In the following, it is assumed that the DSL transceiver has 16 interfaces or ports to the different subscribers (S0 to S15) for which the data aggregation happens over a single fiber link. If one of the DSL links sees a link drop for $S_x$ the PON device may accumulate packets for this interface or port ($S_x$). The total memory storage of the PON element gets bloated with the packets from port $S_x$. Usually, the memory storage is a pool shared for multiple interfaces or ports in the PON element. If the link drops down for one interface out of the 16 interfaces, the memory must not occupy the common pool memory. Otherwise, the services for the other 15 ports or interfaces and the other quality of service (QoS) on those ports could be severely affected. Furthermore, a seamless connectivity between the DSL/G.fast/G.hn transceiver and the PON element, especially the traffic aggregator of the PON element is desirable. However, the data rates of the different individual subscribers handled by the DSL transceiver are not known to the PON element.

Additionally, there is not back pressure mechanism established today between the OLT and the passive optical network (PON) element, which receives data from the OLT and which transmits the data packets to the DSL transceiver.

Accordingly, a need exists to solve the above-mentioned problems and to effectively cope with the situation that different data rates are present for the different subscribers and that the traffic may drop from a high signal flow to no signal at all for one of the subscribers.

SUMMARY

This need is met by the features of the independent claims. Further aspects are described in the dependent claims.

According to a first aspect, a DSL transceiver is provided comprising a plurality of first interfaces configured to transmit data packet streams in a downlink direction to different subscribers and to receive data packet streams from the different subscribers. Furthermore, a second interface is provided configured to transmit data packet streams in an uplink direction to a passive optical network element or at least in direction of the passive optical network element. Furthermore, at least one processing unit is provided configured to detect a physical layer indicator of a loss of signal of one of the first interfaces received at the physical layer at said one first interface, wherein the physical layer indicator is a parameter of a physical layer of an OSI model deployed in one of the first interfaces. When the at least one processing unit detects the physical layer indicator for said one first interface, the second interface transmits the physical layer indicator in the uplink direction to the passive optical network element.

With the physical layer indicator indicating that for one of the subscribers a loss of signal is detected and with the transmission of the physical layer indicator in the direction of the passive optical network element, the loss of signal information can be received at the passive optical network element or at the network processor very early. This can help the passive optical network element to adapt a possible aggregation of data packets for the different subscribers accordingly.

The physical layer indicator may be transmitted to higher layers, such as a data link layer and can then be transmitted further to the PON element where this information can be used to effectively control the packet aggregation carried out at the PON device for the different subscribers.

The physical layer indicator can be a Physical Medium Dependent, PMD sublayer indicator, e.g. an Xon/Xoff signal according the ITU standard G.int. which is ITU-T G.999.1.

The invention furthermore relates to the corresponding method for operating the DSL or G.fast (G.fast=ITU-T G.9700 and G.9701)/G.hn (G.hn=ITU-T G.9960) transceiver.

The invention furthermore relates to a system comprising the above-described DSL/G.fast/G.hn receiver and the PON element which are connected via the second interface. When the at least one processing unit of the DSL/G.fast/G.hn transceiver detects the physical layer indicator for one of the interfaces connected to the different subscribers, the second interface transmits the physical layer indicator to the passive optical network element.

Preferably the passive optical network element comprises a traffic aggregator including different aggregator sections which is configured to aggregate the data packet streams for the different subscribers using the different aggregator sections. The traffic aggregator may control the storage space taking into account the physical layer indicator received from the second interface.

The invention furthermore relates to the corresponding method for operating the system including the DSL/G.fast/G.hn transceiver and the PON element.

The invention furthermore relates to the DSL/G.fast/G.hn transceiver comprising the plurality of first interfaces and the second interface. Furthermore, the at least one processing unit is configured to determine for each of the first interfaces an average data rate from a physical layer occurring at the corresponding first interface and is configured to generate a corresponding data rate indicator indicating a data rate at the corresponding first interface. The second interface is configured to transmit the data rate indicators of the first interfaces in direction of or directly to the passive optical network element.

The invention furthermore relates to a system comprising the digital line subscriber/G.fast/G.hn and the passive optical network element connected via the second interface to the DSL/G.fast/G.hn transceiver. A traffic aggregator of the passive optical network element aggregates data packets for the different first interfaces of the DSL/G.fast/G.hn transceiver. The traffic aggregator comprises different aggregator sections for the different first interfaces. The traffic aggregator is configured to control the size of the different aggregator sections taking into account the data rate indicators of the first interfaces.

The traffic aggregator can use the information of the data link rates of each of each of the subscribers to allocate the aggregator sections, e.g. the memory sections, accordingly. The aggregator can provide the aggregator sections in dependence of the data rates for each subscriber.

Furthermore, a method for operating the system comprising the DSL/G.fast/G.hn transceiver and the passive optical network element is provided which operates as discussed above.

Furthermore, an optical line terminal, OLT, is provided configured to provide a plurality of different data packet streams to different subscribers. A first interface of the OLT connected to an optical network element, ONT, is provided which is configured to exchange the data packet streams and time slots with the ONT. Furthermore, the interface receives data rate information including information about the data rates present at the ONT for the different subscribers. A processing unit of the OLT assigns the different data packet streams to time slots for the downlink transmission to the ONT taking into account the data rate information.

BRIEF DESCRIPTION OF THE DRAWINGS

Various features and embodiments of the present application will become more apparent when read in conjunction with accompanying drawings.

DETAILED DESCRIPTION

In the following embodiments will be described in detail with reference to the accompanying drawings. It is to be understood that the following description of the embodiments is not to be taken in a limiting sense. The scope of the invention is not to be limited by the embodiments described hereinafter or by the drawings, which are to be taken demonstratively only.

The drawings are to be regarded as being schematic representation and elements illustrated in the drawings are not necessarily shown to scale. Rather the various elements are represented such that their function and general purpose become apparent for a person skilled in the art. Any connection r coupling between functional blocks, devices, components or other physical or functional units shown in the drawings or described herein may be implemented by an indirect connection or coupling. A coupling between components may also be established over a wireless connection, unless explicitly stated otherwise. Functional blocks may be implemented in hardware, firmware, software or a combination thereof.

Figure 1:
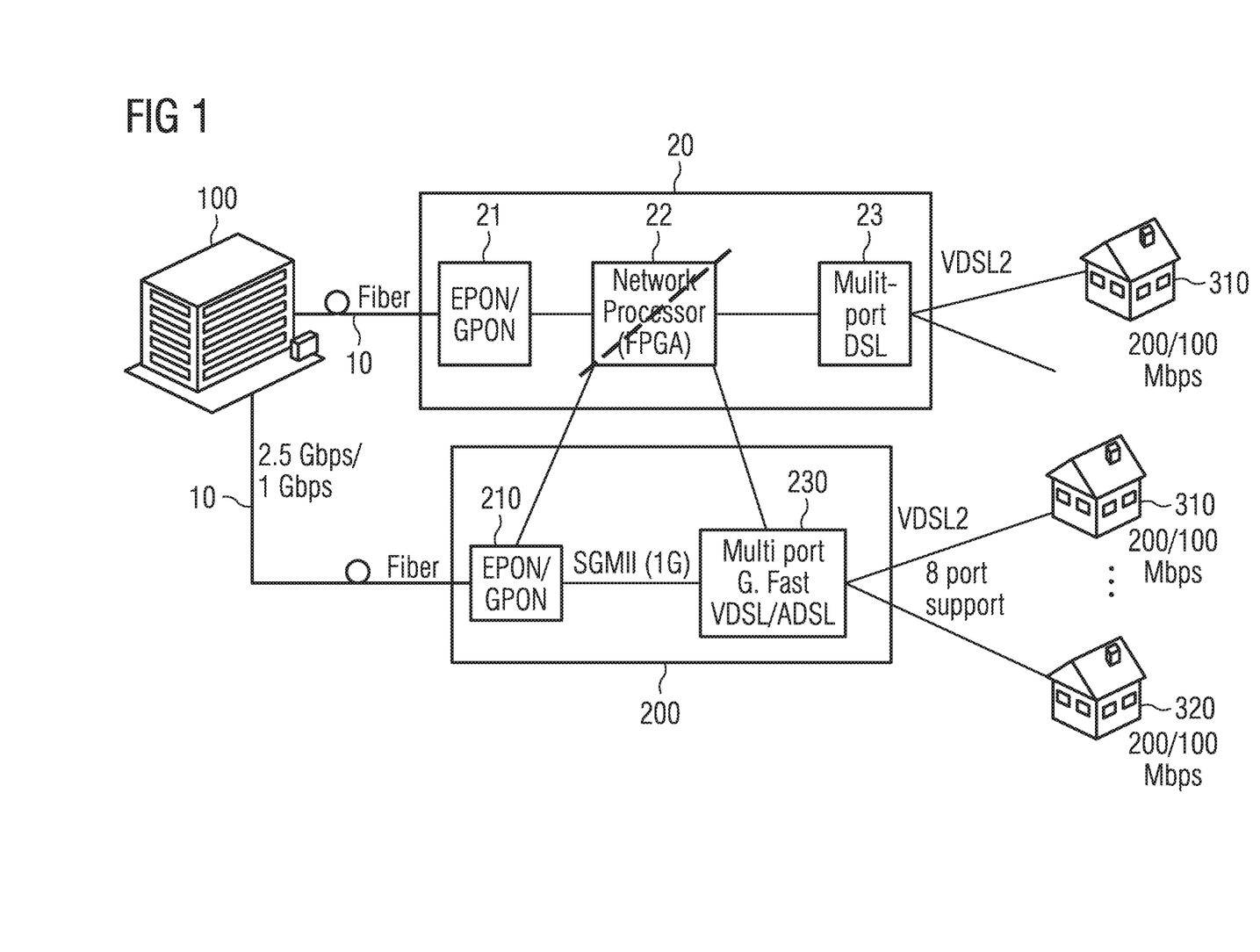
FIG. 1 is an architectural overview of a system in which data packet streams are transmitted from optical line terminal OLT via a DSL/G.fast/G.hn transceiver to different subscribers with an improved flow control.

Hereinafter, techniques are described which allow the generation of a path with short communication loop between a passive optical network element which aggregates traffic from multiple subscribers and a DSL/G.fast/G.hn transceiver. FIG. 1 is a schematic architectural view of a system transmitting data packet streams to different subscribers. The data packet streams can originate from an internet service provider. At the side of the service provider, a central optical line terminal, OLT, 100 is provided, which distributes service data packet streams over a fiber 10 via a system 200 to multiple subscribers such as subscribers 310, 320 shown in FIG. 1. In the upper part of FIG. 1, a solution known in the art is shown in which a system 20 is used in which an EPON, Ethernet Passive Optical Network, element 21 receives the data packet streams from OLT 100 and transmits them to a network processor 22 from where the data are transmitted to the multi port DSL entity 23, from where the different data packet streams are distributed to the different subscribers 310, 320.

In the lower part of FIG. 1, an embodiment is disclosed, which helps to improve the handling of the different data packet streams, especially an embodiment which can better cope with the bursty nature of data packet streams transmitted to the subscribers 310, 320 or received from the subscribers. In the lower part of FIG. 1, the system comprises an EPON/GPON (Gigabit PON) 210 receiving the data packet streams transmitted over fiber 10, wherein the EPON/GPON 210 is connected via an SGMII/RGMII/GMII/MII/PCIe/Posphy/Utopia interface (Serial Gigabit Media Independent Interface) to a multi port DSL/G.fast/G.hn transceiver 230. DSL/G.fast/G.hn transceiver 230 comprises multiple downlink ports or interfaces, such as 8 or 16 or any other numbers of interfaces, each interface being connected to one subscriber 310. The different subscriber 310 or 320 may have different DSL/G.fast/G.hn connections, e.g. first subscriber 310 may have subscribed for a data rate of 50 Mbps, whereas another subscriber such as subscriber 320 has subscribed to 10 Mbps. Furthermore, a subscriber may start to download an application such as a video stream and another subscriber may start transmitting an email via DSL transceiver 230. Thus, the different subscribers have different data traffic needs and there are no constant data rates transmitted to or from the subscribers. The PON element 210 should be made aware of the changes in the link status as fast as possible. If 16 subscribers are connected to a single DSL/G.fast/G.hn transceiver, the traffic from 16 DSL subscribers are aggregated over the single SGMII/GMII/RGMII/PCIe interface shown between PON element 210 and the DSL/G.fast/G.hn transceiver 230. The aggregated data traffic from 16 subscribers gets transported over the SGMII/RGMII/GMII/PCIe interface from the DSL/G.fast/G.hn transceiver to the PON element 210.

The ITU standard G. int allows for a colored pause frame to indicate an Xon/Xoff status per port (or subscriber) and for each bearer channel per port. The Xon/Xoff status is used to indicate that the corresponding interface is capable of receiving a packet, wherein the Xoff signal is used to indicate that the corresponding interface is not capable of receiving a packet. Typically the Xon/Xoff status is detected on the DSL/G.fast/G.hn modem layer based on the increase in memory storage and if a certain threshold is reached, the Xoff status is sent over to the network processor device. This is the known situation.

According to an embodiment, the signaling mechanism from a PMD (Physical Medium Dependent) layer is used to detect a loss of signal at one of the interfaces and this information, the Xon/Xoff information, is sent over the XGMII (10 gigabit media independent interface) or SGMII/PCIe Interface to the PON device. Hence, a low latency path can be provided to indicate the link status to avoid the increase of the memory at a traffic aggregator provided at the PON element 210. The loss of signal (LOS) from the DSL transceiver, more specifically from PMD is used to directly obtain a back pressure per channel. This can be achieved by passing the Xon/Xoff signal information per port or bearer channel using the G. int standard at the Ethernet packet level. With this mechanism, a lower latency is obtained for the communication between DSL transceiver 230 and the PON element 210. The communication with the lowest latency helps to reduce the buffer storage in the EPON device.

Figure 2:
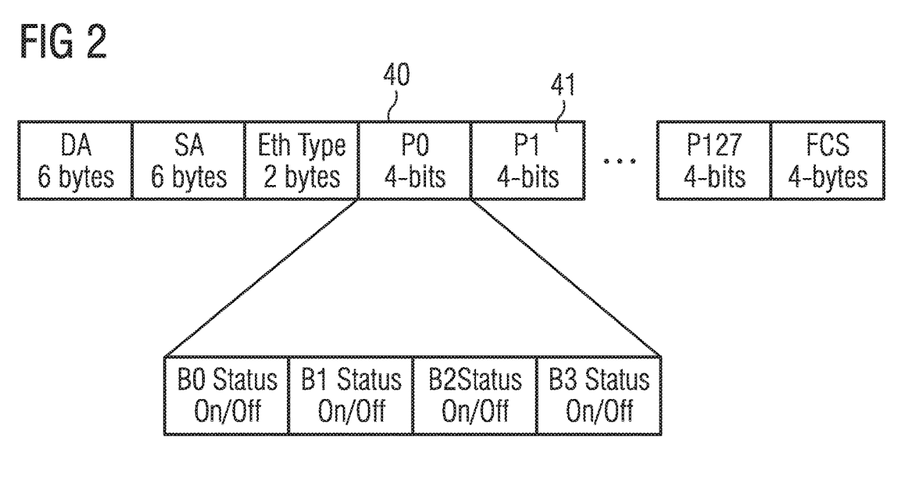
FIG. 2 is a schematic view of a part of a frame according to ITU standard G.int. which may be used for the flow control in FIG. 1.

FIG. 2 shows a schematic view of a data packet composition according to the ITU standard G. int. For each subscriber a frame such as frame 40 or 41 is provided. In the shown embodiments four bits are provided for each of the subscribers. These frames could be used as a physical layer indicator indicating a loss of signal and this information could be transmitted to the EPON/GPON 210.

The DSL/G.fast/G.hn transceiver can comprise a physical layer device, PHY device. The information about the packet loss should now be communicated from the PHY device to the PON element 210. This communication of information about the link status of the PHY device to the PON element will allow to have back pressure and will allow flow control.

As can be seen from FIG. 1, the network processor could be omitted. The PON element 210 can have a much smaller buffer size than the network processor. However, as a low latency in the communication between the DSL/G.fast/G.hn transceiver and the PON element is obtained, the buffer size can be reduced.

Furthermore, it is possible that a communication mechanism is used to communicate the average data rate occurring at the different first interfaces to the PON element 210. The average data rate may be communicated between the physical layer of the DSL/G.fast/G.hn transceiver and the uplink layer device, e.g. the PON element 210. The PON element 210 can then, based on the data rates of the different subscriber links, allocate allocator sections in a traffic allocator taking into account the information of the received data rates. The PON element 210 comprises as discussed further below in connection with FIGS. 3 and 5 a traffic aggregator with different aggregator sections in which the memory is separated into different aggregator sections. The memory allocation or aggregator section allocation can then be made dynamically taking into account the average data rates for the different subscribers. The time period could be averaged over one-DMT or G.fast superframe or on shorter intervals can be the data rate of an OFDM symbol. Furthermore, it is possible that if there are any changes in the data rates, the traffic aggregator could be made aware of the changes.

One possibility to transmit the information of the data rates to the PON device would be the use of the G. int standard shown in FIG. 2. By way of example, the G. int status could be extended by communicating the data rates over the control frame from the DSL transceiver to the PON element. By way of example, additional bits could be added to the data packet frames shown in FIG. 2, such as frames 40 and 41 to indicate the data rates. Another possibility is to indicate the data rates through the serial/host interface to indicate the data rates between the two devices 210 and 220. This will allow a better flow control over the entire system, a lower latency and a better quality of service. Additional bits could be allocated to indicate an increase or decrease in the data rate. Thus, a data rate change can be indicated in the link layer. This allows a tighter control in the decreased latency of the traffic. Furthermore, it is known to transmit a retransmission request, e.g. from the DSL/G.fast/G.hn transceiver to the PON element 210. These retransmission requests requesting the retransmission of missing or not correctly received frames could be used to indicate the data rates. Furthermore, the upper layers may also be used to indicate the changes of the data rates.

Figure 3:
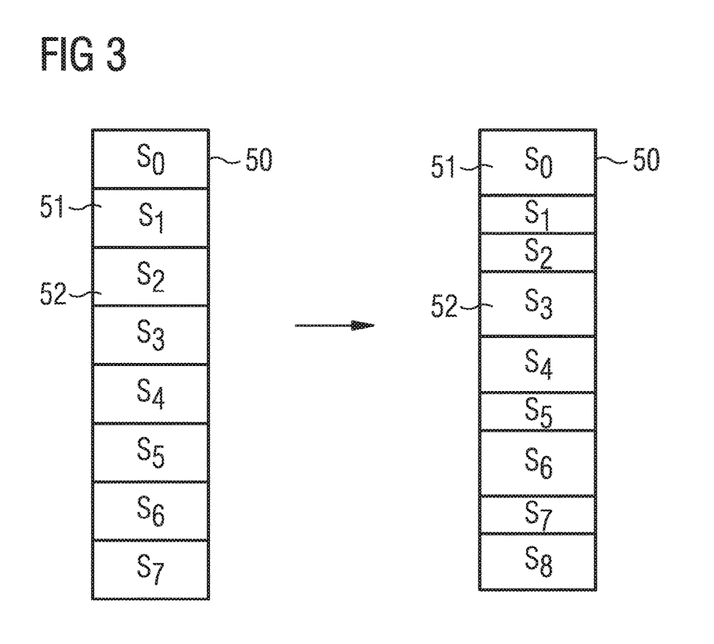
FIG. 3 is a schematic representation of how a traffic aggregator used to aggregate traffic for different subscribers can be adapted taking into account a signal loss information of different subscribers.

FIG. 3 indicates an example of a traffic aggregator used in the PON element. The traffic aggregator has a memory 50 with different aggregator sections 51 or 52, wherein each aggregator sections is provided to aggregate traffic for one of the subscribers. In the shown embodiment, the memory 50 is divided into eight different aggregator sections 51, 52, wherein each section has the same size for each of the subscribers S0 to S7. In the left part of FIG. 3, an embodiment is shown where the traffic aggregator is not aware of the data rate for the different subscribers. In the right part of FIG. 3, an embodiment of the memory 50 is shown in which the different aggregator sections 21 or 52 are adapted taking into account the data rates for the different subscribers. By the way of example, in the shown embodiment, the PON element 210 has received the information that the data rate for a downlink transmission to a subscriber S0 is larger than the data rate for subscriber S1 etc. Thus, the traffic aggregator can dynamically allocate the different aggregator sections in such a way that larger aggregator sections are provided for larger data rates and smaller aggregator sections are provided for smaller or no data rates.

Figure 6:
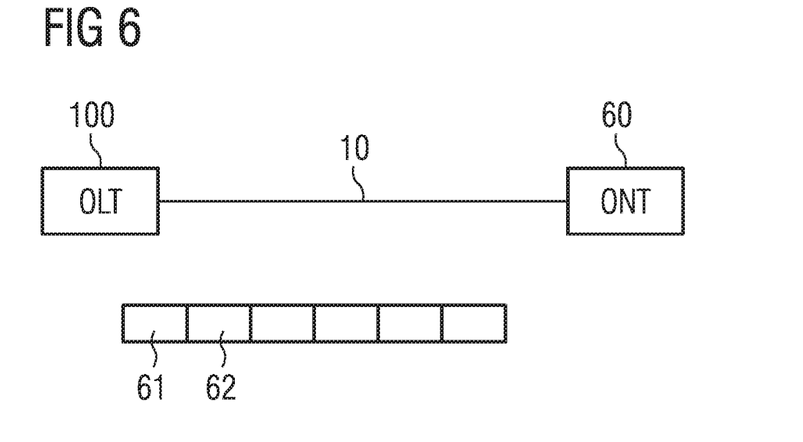
FIG. 6 is a schematic view of a system including an optical line terminal, OLT, and an optical network terminal, ONT, in which the time slot distribution for the exchange of data takes into account the data rates at the subscribers.

In connection with FIG. 6, a further aspect is described. Currently there is no back pressure mechanism established between an optical line terminal, OLT, connected at the service provider and the optical network terminal, ONT, which can include the DSL/G.fast/G.hn transceiver and/or EPON/GPON mentioned above. If the rates are known of the aggregated DSL/G.fast/G.hn data link, the ONT and the OLT system can negotiate the time slots as a potential mechanism to have back pressure. FIG. 6 shows a schematic view of the OLT 100 that is connected via fiber 10 to the ONT 60. The ONT 60 can correspond to the system 200 shown in FIG. 1. However, the ONT can also be a separate element. The data packet streams exchanged between OLT 100 and ONT 60 are exchanged in time slots 61 and 62 as shown in FIG. 6. As discussed above, the PON element 220 receives the information about the data rates used at the different subscribers from the DSL transceiver 220. As the PON element 210 is part of the ONT 60, this information can be transmitted to OLT 100. By way of example, traffic containers (T-CONTs), which normally carry traffic and are used for the management of the upstream bandwidth allocation from the ONT 60 to the OLT 100 can be used to generate a back pressure towards the OLT 100 by including the data rate information of the ONT. If the OLT 100 is aware of the different data rates, the OLT can react accordingly and assign the different time slots 61 and 62 to different subscribers in dependence on the data rate. Thus, if a data rate for a first subscriber is higher than the data rate for a second subscriber, the OLT may assign more of the time slots to the first subscriber than to the second subscriber. Alternatively, the ONT 60 may also generate a control message to indicate its maximum data rate requirements through OMCI (Optical Network Terminal Management and Control Interface) messaging. This messaging will help to cater for efficiency of the overall system providing low latency and efficient memory utilization. The above-discussed features may be implemented as follows: the ONT 60 can request to the ONT 100 for the time slots depending on the data rates. The OLT 110 makes a decision based on the several requests received from the multiple ONTs to which it is connected and depending on the different priorities. The GPON or ONT 60 uses TDM (time division multiplex) approach to communicate bandwith 1-OLT to N-OLT. The overall time slots are fixed as referred as TCONT. Depending on the request received from the N ONTs, the OLT decides as how many TCONT slots each of the ONTs is granted.

Figure 7:
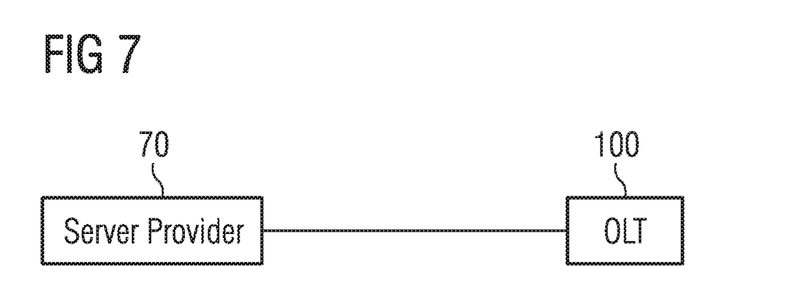
FIG. 7 is a schematic view of a system in which a service provider providing the data packet streams and the OLT exchange data in such a way that the data rates at the different subscribers are taken into account when transmitting data from the service provider to the OLT.

In connection with FIG. 7, a further aspect is described. When the OLT 100 is aware of the data rates of the different subscribers as discussed above, this information can be further transmitted to the ISP (internet service provider) 70 or from Cloud from where the different data packet streams are received. The service provider can be a video server or any other internet server providing information and data packet streams to end users/subscribers. The data rate shaping could be applied further at the service providers 70, wherein the service providers could be controlled in such a way that the maximum data rates are limited which are transmitted to the different subscribers. One possibility is to establish an appropriate TCP window size for the different subscribers in dependence on the data rates detected for the different subscribers. The TCP window size can be configured for each data session. The transmitter determines and sets the window size, for example the web server or the video server. The TCP window scale options with congestion window and receive window parameters are determined based on bandwidth and round trip delay for efficient transfer of data. As proposed in the invention that once we allow to send the data rate for each session; it will allow the server to appropiately determine the TCP window size as determined by the IETF RFC 1323.

The TCP window size is determined based on a) quality of service requirements for different classes of services and b) the overall latency required for the class of service and c) the priority of service class and d) the data rates required for the traffic. Other constraints may exist for the service provider. When the information about the data rate is available at the service provider, a processing unit provided to service provider will be able to make an appropriate decision on the TCP window sizes. Furthermore, any other mechanism to control the data flow might be used.

Figure 4:
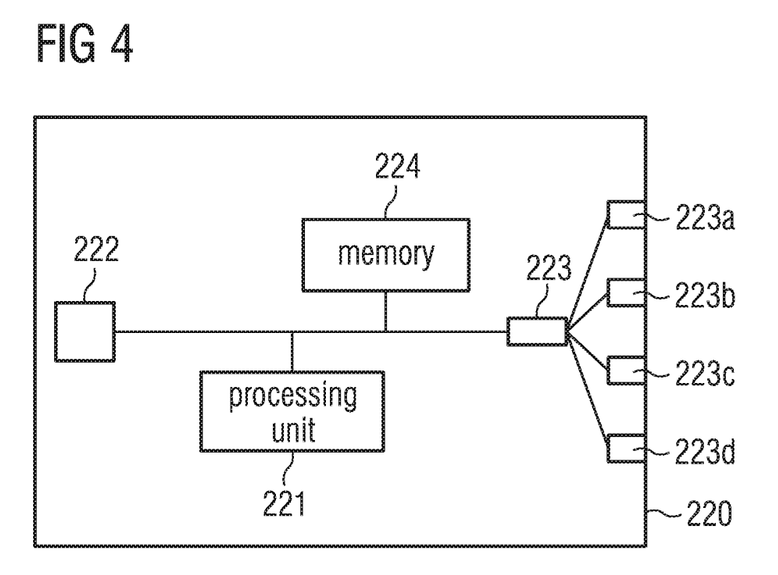
FIG. 4 is a schematic representation of a DSL/G.fast/G.hn transceiver configured to forward a signal loss indicator to a passive optical network component shown in FIG. 1.

FIG. 4 shows a schematic view of the DSL/G.fast/G.hn transceiver used in the embodiments discussed above. The DSL/G.fast/G.hn transceiver 220 comprises a processing unit 221 with one or more processors, which is responsible for the operation of the DSL/G.fast/G.hn transceiver as discussed above. A plurality of first interfaces 223a-223d are provided which are connected to the different subscribers 310 to 320 shown in FIG. 1. A second interface 222 is provided which connects the DSL/G.fast/G.hn transceiver to the PON element 210. The processing unit 221 can generate the commands that are needed to carry out the procedures of the DSL/G.fast/G.hn transceiver discussed above in which the DSL/G.fast/G.hn transceiver is involved. A memory 224 is provided to inter alia store suitable program codes to be executed by the processing unit 221 so as to implement the needed functionalities of the DSL/G.fast/G.hn transceiver.

Figure 5:
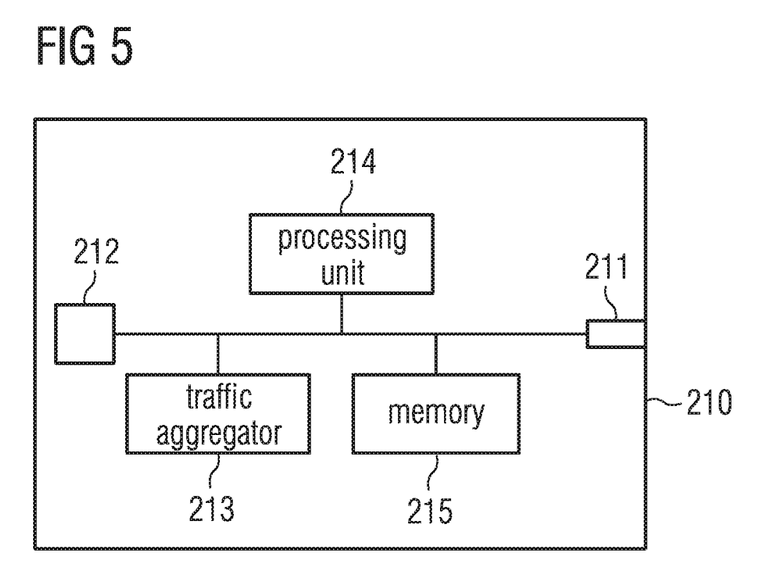
FIG. 5 is a schematic view of the passive optical network element aggregating data packet streams for the different subscribers based on the information received from the DSL/G.fast/G.hn transceiver shown in FIG. 4.

FIG. 5 shows a schematic representation of the PON element 210 including a first interface 211 with which the PON element 210 is connected to the DSL/G.fast/G.hn transceiver 220. A second interface 12 is provided via which the PON element is connected to the OLT 100 shown in FIG. 1. A traffic aggregator 213 is provided in which the traffic of the different subscribers is aggregated if needed. A processing unit 214 with one or more processors is provided which is responsible for the operation of the PON element and which can generate the commands that are needed to carry out the procedures in which the PON element 210 is involved.

What is claimed is:

1. A Digital Subscriber Line, DSL, or G.fast/G.hn transceiver comprising
    a plurality of first interfaces configured to transmit data packet streams in a downlink direction to different subscribers and to receive data packet streams from the different subscribers,
    a second interface configured to transmit data packet streams in an uplink direction to a passive optical network element,
    at least one processor configured to determine, for each of the first interfaces, an average data rate from a physical layer occurring at the corresponding first interface and to generate a corresponding data rate indicator indicating the data rate at the corresponding first interface, wherein the second interface is configured to transmit the data rate indicators of the first interfaces in direction of the passive optical network element.

2. The Digital Subscriber Line, DSL, or G.fast/G.hn transceiver according to claim 1, wherein the second interface is configured to operate as a Gigabit Media Independent Interface, GMII or PCIe interface.

3. The Digital Subscriber Line, DSL, or G.fast/G.hn transceiver according to claim 1, wherein the at least one processor is configured to determine, for each of the first interfaces, an average data rate.

4. The Digital Subscriber Line, DSL, or G.fast/G.hn transceiver according to claim 1, wherein the second interface is configured to transmit the data rate indicators in control frames of an ITU standard G.int.

5. The Digital Subscriber Line, DSL, or G.fast/G.hn transceiver according to claim 1, wherein the data rate indicator is indicating the average data rate from a physical layer of the DSL or G.fast/G.hn transceiver to a data link layer of the transceiver.

6. The Digital Subscriber Line, DSL, or G.fast/G.hn transceiver according to claim 1, wherein the at least one processor is configured to determine, for each of the first interfaces, a change of the data rate and configured to include the change of the data rate into the data rate indicator.

7. A system comprising
a Digital Subscriber Line, DSL, or G.fast/G.hn transceiver, the DSL transceiver comprising:
a plurality of first interfaces configured to transmit data packet streams in a downlink direction to different subscribers and to receive data packet streams from the different subscribers,
a second interface configured to transmit data packet streams in an uplink direction to a passive optical network element,
at least one processor configured to determine, for each of the first interfaces, an average data rate from a physical layer occurring at the corresponding first interface and to generate a corresponding data rate indicator indicating the data rate at the corresponding first interface, wherein the second interface is configured to transmit the data rate indicators of the first interfaces in direction of the passive optical network element,
a passive optical network element connected to the second interface, the passive optical network element comprising
a traffic aggregator configured to aggregate data packets for the different first interfaces of the DSL transceiver, the traffic aggregator comprising different aggregator sections for the different first interfaces, wherein the traffic aggregator is configured to control a size of the different aggregator sections taking into account the data rate indicators of the first interfaces.

8. The system according to claim 7, wherein the traffic aggregator is configured to control the size of the different aggregator sections in such a way that the size of an aggregator section provided for one of the first interfaces having a larger data rate than another of the first interfaces is larger than the aggregator size of the other of the first interfaces.

9. The method according to claim 7, the different aggregator sections are controlled in such a way that the size of an aggregator section provided for one of the first interfaces having a larger data rate than another of the first interfaces is larger than the aggregator size of the other of the first interfaces.

10. A method for operating a system comprising a Digital Subscriber Line, DSL, or G.fast/G.hn transceiver and a passive optical network element, the method comprising the step of:
determining, at the DSL/G.fast/G.hn transceiver, a data rate occurring at each of first interfaces, the first interfaces transmitting data packet streams in a downlink direction to different subscribers and receiving data packet streams from the different subscribers,
generating, at the DSL/G.fast/G.hn transceiver, a corresponding data rate indicator indicating the data rate at the corresponding first interface,
transmitting the data rate indicators of the first interfaces from the DSL/G.fast/G.hn transceiver in direction of the passive optical network element,
controlling, at a traffic aggregator, a size of aggregator sections provided at the aggregator for the different first interfaces of the DSL/G.fast/G.hn transceiver, taking into account the data rate indicators of the first interfaces.

11. An optical line terminal, OLT, configured provide a plurality of different data packet streams to different subscribers; comprising:
a first interface connected to an optical network terminal, ONT, wherein the first interface is configured to exchange the plurality of data streams in time slots with the optical network terminal, and configured to receive data rate information, the data rate information including information about the data rates present at the optical network terminal, ONT, for the different subscribers,
at least one processor configured to assign the different data packet streams to the time slots for a downlink transmission to the optical network terminal, ONT, wherein the at least one processor is configured to assign the different data packet streams to the time slots taking into account the data rate information.

12. The optical line terminal according to claim 11, wherein the first interface is configured to receive the data rate information present in a traffic container, the at least one processing unit deducing the data rate information from the traffic container.

13. The optical line terminal according to claim 11, wherein the first interface is configured to receive the data rate information present in a OMCI message, the at least one processing unit deducing the data rate information from the OMCI message.

14. The optical line terminal according to claim 11, wherein the data rate information includes an average data rate having a physical layer present at the optical network terminal for the different subscribers.

15. The optical line terminal according to claim 11, wherein the data rate information includes a maximum data rates possible available for the different subscribers.

16. A system comprising:
an optical line terminal, OLT, configured to provide a plurality of different data packet streams to different subscribers,
an optical network terminal, ONT, configured to provide the different data packet streams to the different subscribers and configured to determine data rate information indicating the data rates of the different subscribers,
a first interface, associated with the ONT, configured to interconnect the optical line terminal and the optical network terminal, and configured to transmit the data rate information to the optical line terminal, and at least one processor, associated with the OLT, configured to assign the different data packet streams to the time slots for a downlink transmission to the optical network terminal, ONT, wherein the at least one processor is configured to assign the different data packet streams to the time slots taking into account the data rate information.

17. The system according to claim 16, wherein the first interface is configured to receive the data rate information present in a traffic container, the at least one processor deducing the data rate information from the traffic container.

18. The system according to claim 16, wherein the first interface is configured to receive the data rate information present in a OMCI message, the at least one processor deducing the data rate information from the OMCI message.

19. The system according to claim 16, wherein the data rate information includes a maximum data rates possible available for the different subscribers.

20. A system comprising:
    a service provider configured to provide a plurality of different data packet streams for different subscribers,
    an optical line terminal, OLT, configured to forward the plurality of different data packet streams in direction of the different subscribers,
    an interface interconnecting the service provider and the optical line terminal, wherein the interface is configured to transmit the plurality of different data packet streams in a downlink direction to the optical line terminal, OLT, and receive a data rate information of the different subscribers from the OLT; and
    at least one processor, associated with the service provider, configured to control the transmission of the different data packet streams to the optical line terminal, OLT, taking into account the data rate information.

21. The system according to claim 20, wherein the at least one processor is configured to control a TCP window size of a TCP window used to transmit the different data packet streams via the interface to the optical line terminal, OLT, taking into account the data rate information.

22. The system according to 20, wherein the data rate information is received by the optical line terminal in an uplink direction from an optical network terminal.

* * * * *